United States Patent [19]
Gelardi et al.

[11] Patent Number: 5,328,126
[45] Date of Patent: Jul. 12, 1994

[54] CASSETTE BRAKE RELEASE

[75] Inventors: Paul J. Gelardi; David A. Capotosto; James R. Dussault, all of Kennebunkport; Michael Raymond, Biddeford, all of Me.

[73] Assignee: LCV Associates, Kennebunkport, Me.

[21] Appl. No.: 14,699

[22] Filed: Feb. 8, 1993

[51] Int. Cl.⁵ .................................. G11B 23/087
[52] U.S. Cl. ................... 242/343.2; 360/132; 242/347
[58] Field of Search ............... 242/198, 199; 360/132

[56] References Cited

U.S. PATENT DOCUMENTS

| | | | |
|---|---|---|---|
| 4,106,724 | 8/1978 | Higashida | 242/198 |
| 4,290,567 | 9/1981 | Saito | 242/198 |
| 4,449,677 | 5/1984 | Ohta et al. | 242/199 |
| 4,452,407 | 6/1984 | Ogata et al. | 242/198 |
| 4,579,295 | 4/1986 | Harada | 242/198 |
| 4,604,671 | 8/1986 | Oishi | 360/132 |
| 4,607,307 | 8/1986 | Sieben | 360/132 |
| 4,608,616 | 8/1986 | Wakui et al. | 242/199 |
| 4,638,393 | 1/1987 | Oishi et al. | 242/198 |
| 4,671,469 | 6/1987 | Ikebe et al. | 242/198 |
| 4,678,140 | 7/1987 | Schoettle | 242/199 |
| 4,679,110 | 7/1987 | Schoettle et al. | 242/198 |
| 4,739,949 | 4/1988 | Lin | 242/198 |
| 4,742,415 | 5/1988 | Oishi | 242/198 |
| 4,874,143 | 10/1989 | Armstrong et al. | 242/198 |
| 4,886,220 | 12/1989 | Oishi | 242/198 |
| 4,903,915 | 2/1990 | Iawhashi | 242/198 |
| 4,918,558 | 4/1990 | Igarashi et al. | 242/198 |
| 5,056,735 | 10/1991 | Gelardi et al. | 242/198 |
| 5,092,536 | 3/1992 | Gelardi et al. | 242/199 |

FOREIGN PATENT DOCUMENTS

| | | |
|---|---|---|
| 285384 | 10/1988 | European Pat. Off. . |
| 61-217976 | 9/1986 | Japan . |
| 8808196 | 10/1988 | PCT Int'l Appl. . |

Primary Examiner—Daniel P. Stodola
Assistant Examiner—John Q. Nguyen
Attorney, Agent, or Firm—James Creighton Wray

[57] ABSTRACT

Brake levers are molded in place through an opening in the base of a video cassette. The brake levers have first brake arms with outward extending reel grippers at distal ends, and second actuator arms with an actuator connected between distal ends of the actuator arms. Medial portions of the levers are supported on integrally formed living hinges with axes perpendicular to the base. Pressing outward on the actuator arms with the actuator rotates the levers about the hinges so that the brake arms and grippers are withdrawn from contact with the reels. The actuator has two legs which are joined centrally by a hinge and which extend angularly to living hinge interconnections with the actuator arms. As a pin or blade pushes on the central connection in a direction parallel to the hinge axes of the operating levers, the actuator legs spread forcing distal ends of the actuator arms apart and distal ends of the brake arms and the grippers together, releasing the reel brake.

15 Claims, 3 Drawing Sheets

CASSETTE BRAKE RELEASE

BACKGROUND OF THE INVENTION

Video cassettes have reel brakes to prevent unspooling of the video tape during handling of the cassette while the cassette is outside of a video cassette recorder player. When placed in the recorder, a pin releases the brake to allow rotation of the reels.

The standard VHS-type cassette hub braking system is designed to be activated by a round pin. The round pin is inserted into a hole in the base of the shell, and the height of the pin causes the brake retractor to pivot on two pins, which in turn pushes against two independent, spring-loaded brakes, causing them to rotate and to disengage the teeth on the two tape hubs. When the pin is removed from the shell, the spring, or springs, returns the brakes to a locking position. In addition, the brakes push against the brake retractor, returning it to its original position.

When the standard round pin is inserted into the shell described in copending applications, the width of the pin spreads the gap between the brake release arms, overcoming a brake return spring and causing the brakes to rotate on two living hinges, and in turn causing the opposite ends of the brakes to rotate away from the teeth on the tape hubs and to disengage. When the pin is removed from the shell, the brake return spring returns the brakes to a locking position.

Standard round brake release pins are used by most video cassette recorder manufacturers. A problem may be incurred with the current system when the standard round pins are not used by the VCR manufacturers. In some instances a rectangular blade is used which can be as thin as 0.030". These alternative designs do not meet major manufacturers' specifications, nonetheless they do work with most standard VHS cassettes. Using the width of the pin to spread brake levers does not work with all shapes and sizes of brake pins.

A need exists for a reel brake which may be molded integrally with a video cassette, which may be activated by a thin blade as well as by a pin.

SUMMARY OF THE INVENTION

The hub lock of the present invention is height activated rather than width activated. When a brake release pin of any shape or approximate thickness is inserted into the cassette, the height of the pin pushes against an integrally molded M-shaped linkage with three living hinges between the two linkages and the brake release arms. Vertical pressure against the intersection of the two center linkages causes the linkages to move upward and also moves the brake release arms outward, rotating them on their hinges and also causing the opposite ends of the brakes to rotate away from the teeth on the tape hubs and to disengage. When the pin is removed from the shell, a brake return spring returns the brakes to a locking position and the linkage to its original position as well.

Brake levers are molded in place through an opening in the base of a video cassette. The brake levers have first brake arms with outward extending reel grippers at distal ends, and second actuator arms with an actuator connected between distal ends of the actuator arms. Medial portions of the levers are supported on integrally formed living hinges with axes perpendicular to the base. Pressing outward on the actuator arms with the actuator rotates the levers about the hinges so that the brake arms and grippers are withdrawn from contact with the reels. The actuator has two legs which are joined centrally by a hinge and which extend angularly to living hinge interconnections with the actuator arms. As a pin or blade pushes on the central connection in a direction parallel to the main hinge axes of the operating levers, the actuator legs spread forcing distal ends of the actuator arms apart and distal ends of the brake arms and the grippers together, releasing the reel brake.

A preferred video cassette reel brake has first and second spaced parallel pins integrally molded with a base of a cassette. First and second living hinges are connected respectively to the pins. The first and second living hinges have first parts fixed to the pins and second parts connected to the first parts for relatively moving thereon about thin intermediate parts, which form the living hinges with first and second spaced parallel axes. First and second brake levers each have first and second oppositely extending arms connected medially to the second parts, for respectively rotating the levers about the first and second axes of the first and second living hinges. The first arms of the levers have outward extending teeth at distal ends thereof for engaging reels in braking relationship. The second arms of the levers have distal ends thereof. A brake release actuator extends between the second arms. The first and second levers and the first and second hinges are formed in a condition which engages the teeth with reels. The brake release actuator has first and second legs joined together medially by an intermediate living hinge, and the legs are joined to the second arms respectively by third and fourth living hinges. The intermediate and third and fourth living hinges are aligned on axes parallel to a base of the cassette for moving the intermediate hinge upwardly as a brake release contacts and moves the intermediate hinge. The third and fourth hinges move outwardly as the intermediate hinge moves upwardly. Distal portions of the second arms rotate outward around the first and second hinges. Distal portions of the first arms rotate inward, withdrawing brake teeth from the reels upon the upward movement of the intermediate hinge and the outward movement of the third and fourth hinges.

A preferred reel brake release mechanism for a video cassette has first and second brake levers mounted on central hinges. First brake arms have outward extending grippers at distal ends thereof. Second actuator arms extend oppositely from the brake arms. A hinged actuator is connected between the second arms. The hinged actuator has first and second actuator legs. A central connection connects proximal portions of the legs. Hinges connect distal portions of the legs to the second actuator arms for moving the second arms outward and the first arms and grippers inward away from reels as the central connection of the actuator is moved in a direction transverse to the levers.

A preferred integrally molded video cassette has the reel brake molded through an opening in a base.

These and further and other objects and features of the invention are apparent in the disclosure, which includes the above and ongoing written specification, with the claims and the drawings.

DETAILED DESCRIPTION OF THE DRAWINGS

Figure 1:
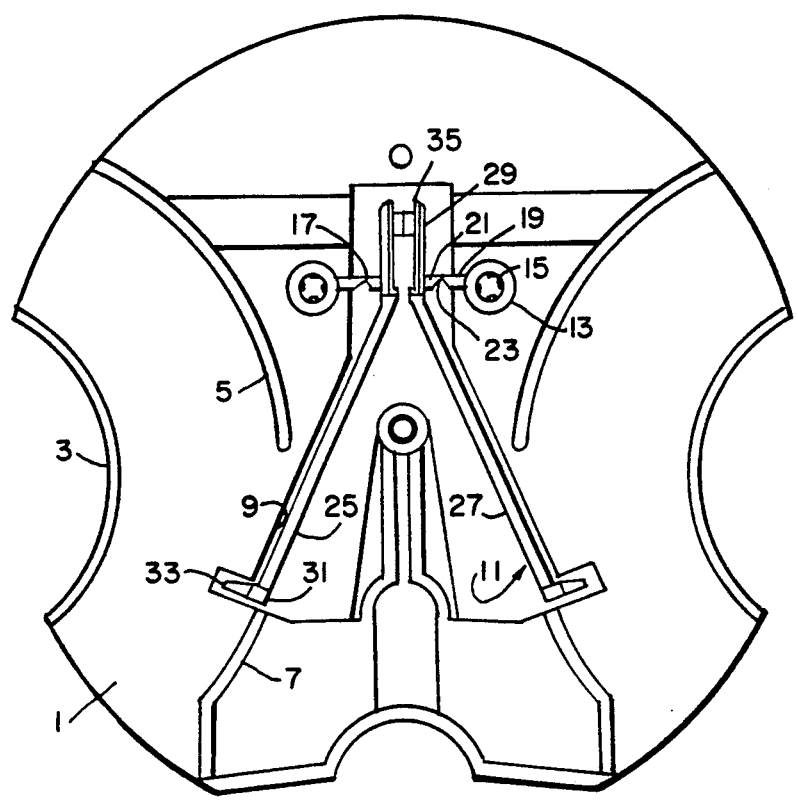
FIG. 1 is a detail of a reel brake constructed according to the present invention.

The base of a molded cassette is generally indicated by the numeral 1. The base has openings 3 for locating the reels and raised tape guiding surfaces 5 in which the reels turn. Raised guides 7 are provided on the base, and an opening 9 is provided in the base. A brake generally indicated by the numeral 11 is integrally formed with the molded base. Pins 13 having snap tops 15 are also integrally formed with the base. The snap tops 15 engage complementary structures on the molded top. Living hinges 17 are integrally formed with the pins and with the base. The integral hinges 17 include fixed parts 19 which are connected to the pins 13, and movable parts 21 which are joined by a thin hinge section 23. The movable parts 21 are integrally formed with levers 25, which include the brake arms 27 and the actuator arms 29. The brake levers 25 rotate around the hinges 23 so that outward movement of distal ends of the actuator arms 29 causes inward movement of distal ends of the brake arms 27. Distal ends 31 of the brake arms 27 have grippers 33, which are gear-engaging teeth extending normally from the brake arms. The grippers 33 engage reel edges which are serrated or grooved, such as in a gear, to positively lock the reels and prevent them from rotating until the brake is released. The brake is released by pushing outward on distal ends 35 of the actuator arms 29.

The position of the brake shown in FIG. 1 is molded and at rest, in which the gripper teeth 33 are in their outward position for engaging and stopping reel turning. The brake normally returns to this at rest, locking position. A compression spring may engage outer sides of the actuator arms to ensure reel braking.

Figure 2:
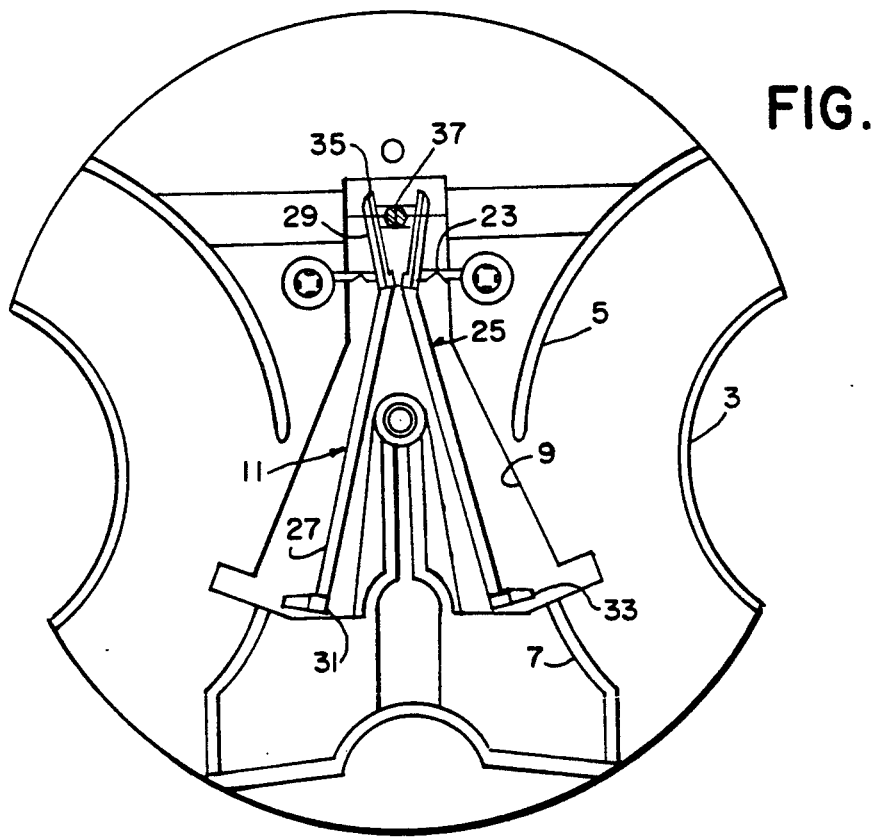
FIG. 2 is a detail of the reel brake shown in FIG. 1 in a reel releasing position.

FIG. 2 shows the brake moved to its disengaging position by forcing the distal ends 35 of the actuator arms 29 outward. Forcing the distal ends of the actuator arms outward pivots the levers 25 about hinges 23, causing the brake arms 27 to move inward, withdrawing the grippers 33 from reel locking position.

Spreading the distal ends of the actuator arms 29 is accomplished by a pin 27, as will be described in the details.

Figure 4:
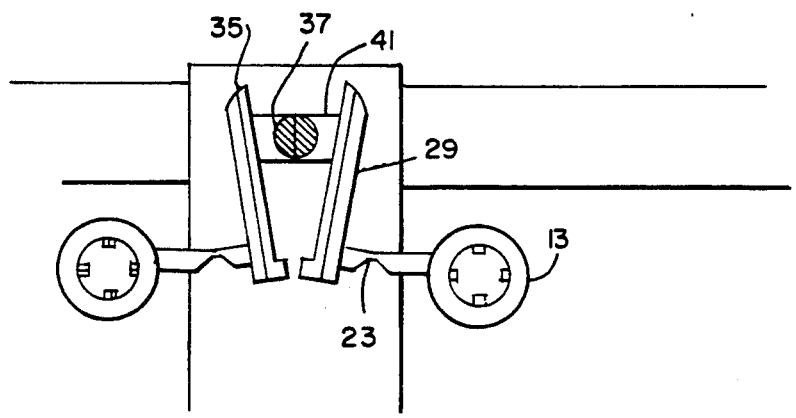
FIG. 4 is a detail of the actuator arms and actuator in a reel brake release condition, as shown in FIG. 2.
Figure 3:
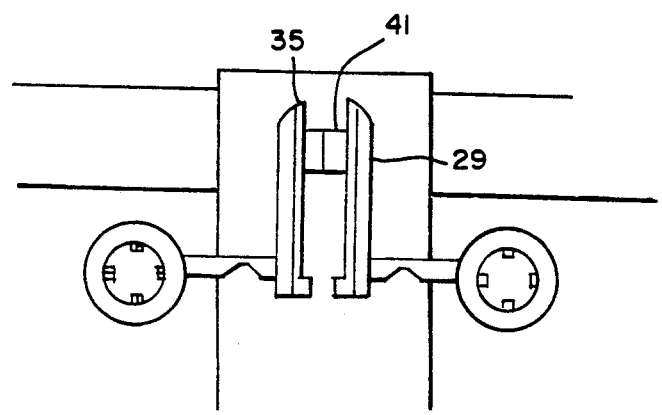
FIG. 3 is a detail of the actuator arms and actuator of the brake release lever shown in FIG. 1.

FIG. 3 is a detail of the actuator arm shown in the position of FIG. 1. FIG. 4 is a detail of the actuator arm shown in the position of FIG. 2, in which the pin 37 has pushed the actuator 41 to move the distal ends 35 outward.

Figure 5:
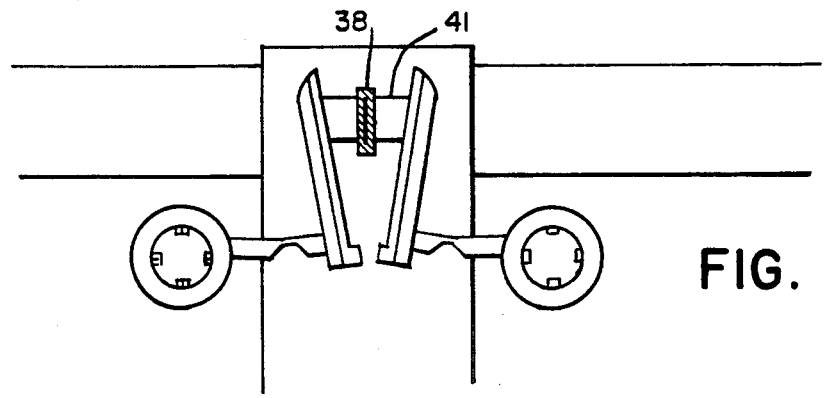
FIGS. 5 and 6 show actuator arms and actuator in a brake release condition, as operated by blade operators.
Figure 6:
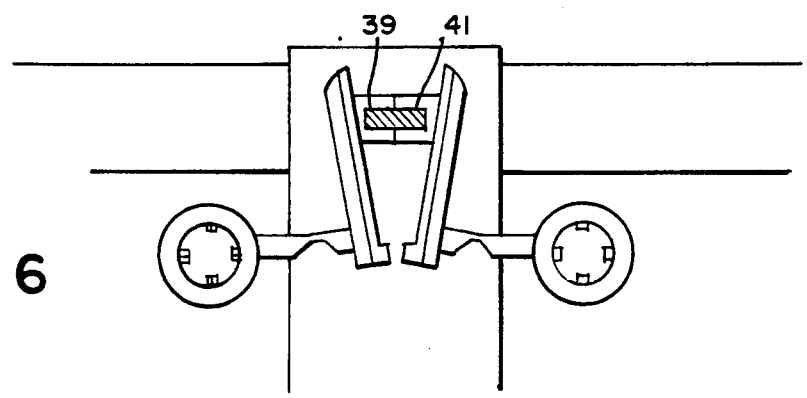

As shown in FIGS. 5 and 6, the pushing of the actuator 41 may be accomplished by a blade 38 or a blade 39 oriented transverse to the actuator or parallel to the actuator 41.

Figure 7:
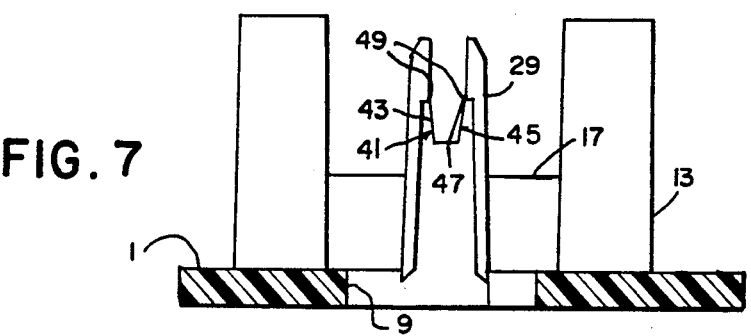
FIG. 7 is an end view detail of the actuator arm and actuator in a brake applying condition.
Figure 8:
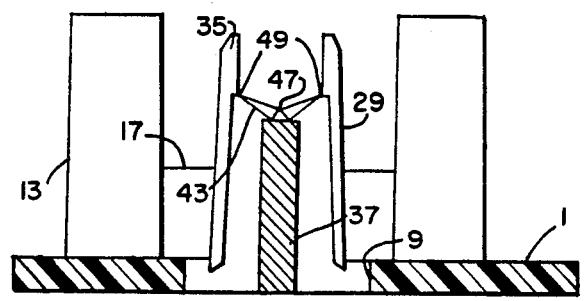
FIG. 8 is an end view detail of the actuator arm and actuator in a brake release position, with the actuator being acted upon by a brake release pin.
Figure 9:
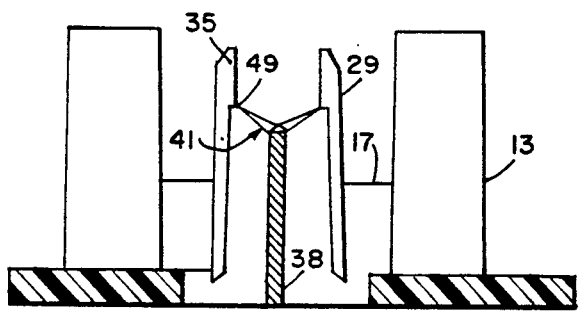
FIG. 9 is an end view detail of the actuator arm and actuator, with the actuator being pushed upward by a fixed blade.

FIGS. 7, 8 and 9 are end views of the actuator arms and actuator.

FIG. 8 shows the actuator being moved by a pin.

FIG. 9 shows the actuator being moved by a blade.

Referring to FIG. 7, the base of the cassette is generally indicated by the numeral 1. Opening 9 in the base is shown, through which the brake mechanism is molded and operated. Pins 13 extend upward from the base, and hinges 17 are connected between the pins and proximal portions of the actuator arms 29. Actuator 41 is molded with first and second legs 43 and 45 joined by an intermediate living hinge 47. Additional living hinges 49 join the legs 43 and 45 of the actuator 41 to the actuator arms 29.

As shown in FIG. 8, pushing upward on the actuator arms by the brake release pin 37 in the VCR causes the actuator legs 43 and 45 to spread the distal ends 35 of the actuator arms 29 into brake release position.

As shown in FIG. 9, the blade 38 from a VCR pushes upward on the actuator 41, causing the legs 43 and 45 to spread, rotating the legs about living hinge 47 and causing the legs to push outward and pivot about living hinges 49 connected to the actuator arms 29.

The living hinges 23 may be connected to the brake levers 25 at any medial position between the actuator arms and the brake arms. The portions of the brake levers between the hinges 23 and the distal ends 31 of the brake arms are referred to as brake arms, and the portions of the brake levers between the living hinge 23 and the distal end 35 of the actuator arms are referred to as actuator arms.

Because the two brake release levers pivot, when a straight brake release leg or web is moved by the brake release pin the web or leg cannot freely hinge and move the brake release levers because the three leg or web hinges have no common axis of rotation. The brake release arms have to move laterally for the hinges to move freely. Since the brake release levers rotate, the forward and rear sections of the legs or webs move different distances and create a tendency for a tearing action on the hinges.

For the hinges to move freely and for the brake release levers to pivot freely and unlock the hubs, the three hinges should not be parallel and should not have a common axis of rotation. The axes of the three web hinges meet at a common point.

Figure 10:
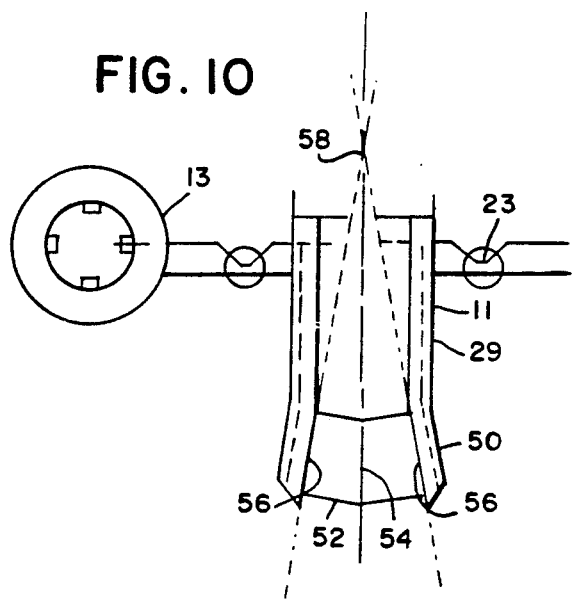
FIG. 10 is a top plan detail of an improved hinged actuator.

FIG. 10 shows the levers 11 mounted on hinges 13. The actuator arms 29 have angularly outward extending portions 50. The angular portions are connected by hinged webs or legs 52. In the preferred embodiment shown in FIG. 2, the legs 52 are joined medially along a sloping hinge 54 and are joined by hinges 56 to the sloped portions 50 of the actuators 29.

Figure 11:
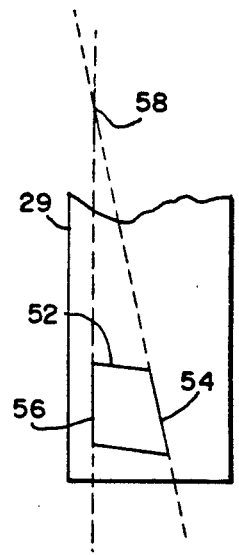
FIG. 11 is a side elevation detail of the improved hinged actuator shown in FIG. 10.

A side detail is shown in FIG. 11. Referring to FIGS. 10 and 11, it can be seen that the non-parallel axes of the hinge, when extended on imaginary lines, all intersect at a common point 58.

While the invention has been described with reference to specific embodiments, modifications and variations of the invention may be constructed without departing from the scope of the invention, which is defined in the following claims.

We claim:

1. A video cassette reel brake comprising first and second spaced parallel pins integrally molded with a base of a cassette, first and second living hinges connected respectively to the pins, the first and second living hinges having first parts fixed to the pins and having second parts connected to the first parts for relatively rotating thereon about thin intermediate parts which form the living hinges with first and second spaced parallel axes, first and second brake levers, each having first and second oppositely extending arms connected medially to the second parts for respectively rotating the levers about the first and second axes of the first and second living hinges, the first arms of the levers having outwardly extending teeth at distal ends thereof for engaging reels in braking relationship, the second arms of the levers having distal ends thereof, and a brake release actuator which extends between the second arms, the first and second levers and the first and second hinges being formed in a condition which engages the teeth with reels, the brake release actuator having first and second legs joined together medially by an intermediate living hinge and the legs being joined to the second arms respectively by third and fourth living hinges, the intermediate and third and fourth living hinges being aligned on axes parallel to a base surface of the cassette for moving the intermediate hinge upwardly as a brake release member contacts and moves the intermediate hinge, for moving the third and fourth hinges outwardly as the intermediate hinge moves upwardly, for rotating distal portions of the second arms outwardly around the first and second hinges and rotating distal portions of the first arms inwardly and for withdrawing brake teeth from the reels upon the upward movement of the intermediate hinge and the outward movement of the third and fourth hinges.

2. The apparatus of claim 1, wherein the intermediate hinge and the third and fourth living hinges have non-parallel axes.

3. The apparatus of claim 2, wherein the non-parallel axes converge at a point.

4. The apparatus of claim 3, wherein the point of convergence is within an area bounded by the brake release levers.

5. The apparatus of claim 1, wherein the second arms of the brake release levers have outwardly divergently slanted portions to which the brake release actuator is hinged.

6. A reel brake release mechanism for a video cassette comprising first and second brake levers, central mounting hinges connected to the levers, the levers having first brake arms with outward extending grippers at distal ends thereof, and second actuator arms extending oppositely from the brake arms, and a hinged actuator connected between the second arms, the hinged actuator having first and second actuator legs, a central connection connecting proximal portions of the legs, and hinges connecting distal portions of the legs to the second actuator arms for rotating the second arms outwardly and the first arms and grippers inwardly away from reels as the central connection of the actuator is moved in a direction transverse to the levers.

7. The reel brake release mechanism of claim 2, wherein the hinges connecting distal portions of the legs to the second actuator arms and the actuator hinges are non-parallel.

8. The apparatus of claim 7, wherein the non-parallel axes converge at a point.

9. The apparatus of claim 8, wherein the point of convergence is within an area bounded by the brake release levers.

10. The apparatus of claim 6, wherein distal portions of the actuator arms remote from the mounting hinges are bent divergently outwardly.

11. An integrally molded video cassette having a reel brake molded through an opening in a base, comprising a video cassette reel brake comprising first and second spaced parallel pins integrally molded with a base of a cassette, first and second living hinges connected respectively to the pins, the first and second living hinges having first parts fixed to the pins and having second parts connected to the first parts for relatively rotating thereon about thin intermediate parts which form the living hinges with first and second spaced parallel axes, first and second brake levers, each having first and second oppositely extending arms connected medially to the second parts for respectively rotating the levers about the first and second axes of the first and second living hinges, the first arms of the levers having outward extending teeth at distal ends thereof for engaging reels in braking relationship, the second arms of the levers having distal ends thereof, and a brake release actuator which extends between the second arms, the first and second levers and the first and second hinges being formed in a condition which engages the teeth with reels, the brake release actuator having first and second legs joined together medially be an intermediate living hinge and the legs being joined to the second arms respectively by third and fourth living hinges, the intermediate and third and fourth living hinges being aligned on axes parallel to a base of the cassette for moving the intermediate hinge upwardly as a brake release contacts and moves the intermediate hinge, for rotating the third and fourth hinges as the intermediate hinge moves upwardly, for rotating distal portions of the second arms outwardly around the first and second hinges and rotating distal portions of the first arms inwardly and for withdrawing brake teeth from the reels upon the upward movement of the intermediate hinge and the outward movement of the third and fourth hinges.

12. The apparatus of claim 11, wherein the intermediate hinge and the third and fourth living hinges have non-parallel axes.

13. The apparatus of claim 12, wherein the non-parallel axes converge at a point.

14. The apparatus of claim 13, wherein the point of convergence is within an area bounded by the brake release levers.

15. The apparatus of claim 11, wherein the second arms of the brake release levers have outwardly divergently slanted portions to which the brake release actuator is hinged.

* * * * *